(12) United States Patent
Lindahl et al.

(10) Patent No.: US 8,670,985 B2
(45) Date of Patent: *Mar. 11, 2014

(54) DEVICES AND METHODS FOR IDENTIFYING A PROMPT CORRESPONDING TO A VOICE INPUT IN A SEQUENCE OF PROMPTS

(75) Inventors: Aram Lindahl, Menlo Park, CA (US); Policarpo Wood, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/615,418

(22) Filed: Sep. 13, 2012

(65) Prior Publication Data
US 2013/0006643 A1    Jan. 3, 2013

Related U.S. Application Data

(63) Continuation of application No. 12/686,774, filed on Jan. 13, 2010, now Pat. No. 8,311,838.

(51) Int. Cl.
*G10L 21/00* (2006.01)
*G10L 15/00* (2006.01)

(52) U.S. Cl.
USPC ......... 704/270.1; 704/270; 704/275; 704/231

(58) Field of Classification Search
USPC .............. 704/231, 248, 253, 270, 270.1, 271, 704/272, 275
See application file for complete search history.

(56) References Cited

U.S. PATENT DOCUMENTS

| | | | |
|---|---|---|---|
| 3,704,345 A | 11/1972 | Coker et al. | |
| 3,828,132 A | 8/1974 | Flanagan et al. | |
| 3,979,557 A | 9/1976 | Schulman et al. | |
| 4,278,838 A | 7/1981 | Antonov | |
| 4,282,405 A | 8/1981 | Taguchi | |
| 4,310,721 A | 1/1982 | Manley et al. | |

(Continued)

FOREIGN PATENT DOCUMENTS

| | | | |
|---|---|---|---|
| CH | 681573 A5 | 4/1993 |
| DE | 3837590 A1 | 5/1990 |

(Continued)

OTHER PUBLICATIONS

Domingue, J., et al., "Web Service Modeling Ontology (WSMO)— An Ontology for Semantic Web Services," Jun. 9-10, 2005, position paper at the W3C Workshop on Frameworks for Semantics in Web Services, Innsbruck, Austria, 6 pages.

(Continued)

*Primary Examiner* — Jesse Pullias
(74) *Attorney, Agent, or Firm* — Morgan, Lewis & Bockius LLP

(57) ABSTRACT

This is directed to processing voice inputs received by an electronic device while prompts are provided. In particular, this is directed to providing a sequence of prompts to a user (e.g., voice over prompts) while monitoring for a voice input. When the voice input is received, a characteristic time stamp can be identified for the voice input, and can be compared to periods or windows associated with each of the provided prompts. The electronic device can then determine that the prompt corresponding to a window that includes the characteristic time stamp was the prompt to which the user wished to apply the voice input. The device can process the voice input to extract a user instruction, and apply the instruction to the identified prompt (e.g., and perform an operation associated with the prompt).

40 Claims, 5 Drawing Sheets

(56) References Cited

U.S. PATENT DOCUMENTS

| | | |
|---|---|---|
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,617 A | 9/1991 | Bianco |
| 5,057,915 A | 10/1991 | Kohorn et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |

(56) References Cited

U.S. PATENT DOCUMENTS

| | | |
|---|---|---|
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,233 A | 1/1999 | Walker et al. |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,751 A | 7/1999 | Cohrs et al. |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Wang et al. |
| 6,775,358 B1 | 8/2004 | Breitenbach et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |

(56) References Cited

U.S. PATENT DOCUMENTS

| | | |
|---|---|---|
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,937,975 B1 | 8/2005 | Elworthy |
| 6,937,986 B2 | 8/2005 | Denenberg et al. |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,020,685 B1 | 3/2006 | Chen et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,213 B2 | 6/2006 | Thompson |
| 7,069,560 B1 | 6/2006 | Cheyer et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,143,040 B2 | 11/2006 | Durston et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,383,170 B2 | 6/2008 | Mills et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,467,087 B1 | 12/2008 | Gillick et al. |
| 7,475,010 B2 | 1/2009 | Chao |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,571,106 B2 | 8/2009 | Cao et al. |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,672,841 B2 | 3/2010 | Bennett |
| 7,673,340 B1 | 3/2010 | Cohen et al. |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,728 B2 | 9/2010 | Ben-David et al. |
| 7,801,729 B2 | 9/2010 | Mozer |
| 7,809,569 B2 | 10/2010 | Attwater et al. |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,853,574 B2 | 12/2010 | Kraenzel et al. |
| 7,873,519 B2 | 1/2011 | Bennett |
| 7,873,654 B2 | 1/2011 | Bernard |
| 7,881,936 B2 | 2/2011 | Longé et al. |
| 7,890,652 B2 | 2/2011 | Bull et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |

(56) References Cited

U.S. PATENT DOCUMENTS

| | | |
|---|---|---|
| 7,925,525 B2 | 4/2011 | Chin |
| 7,930,168 B2 | 4/2011 | Weng et al. |
| 7,930,183 B2 | 4/2011 | Odell et al. |
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,301,456 B2 | 10/2012 | Gazdzinski |
| 8,311,834 B1 | 11/2012 | Gazdzinski |
| 8,311,838 B2 | 11/2012 | Lindahl et al. |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,447,612 B2 | 5/2013 | Gazdzinski |
| 2001/0047264 A1 | 11/2001 | Roundtree |
| 2002/0032564 A1 | 3/2002 | Ehsani et al. |
| 2002/0046025 A1 | 4/2002 | Hain |
| 2002/0069063 A1 | 6/2002 | Buchner et al. |
| 2002/0077817 A1 | 6/2002 | Atal |
| 2002/0103641 A1 | 8/2002 | Kuo et al. |
| 2002/0164000 A1 | 11/2002 | Cohen et al. |
| 2002/0198714 A1 | 12/2002 | Zhou |
| 2003/0171928 A1 | 9/2003 | Falcon et al. |
| 2004/0093215 A1 | 5/2004 | Gupta et al. |
| 2004/0128137 A1 | 7/2004 | Bush et al. |
| 2004/0135701 A1 | 7/2004 | Yasuda et al. |
| 2004/0236778 A1 | 11/2004 | Junqua et al. |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | DiFabbrizio et al. |
| 2005/0182629 A1 | 8/2005 | Coorman et al. |
| 2005/0196733 A1 | 9/2005 | Budra et al. |
| 2005/0288936 A1 | 12/2005 | Busayapongchai et al. |
| 2006/0018492 A1 | 1/2006 | Chiu et al. |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2006/0247931 A1 | 11/2006 | Caskey et al. |
| 2007/0050191 A1 | 3/2007 | Weider et al. |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0174188 A1 | 7/2007 | Fish |
| 2007/0185917 A1 | 8/2007 | Prahlad et al. |
| 2007/0219803 A1 | 9/2007 | Chiu et al. |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0114480 A1 | 5/2008 | Harb |
| 2008/0120112 A1 | 5/2008 | Jordan et al. |
| 2008/0129520 A1 | 6/2008 | Lee |
| 2008/0140657 A1 | 6/2008 | Azvine et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0248797 A1 | 10/2008 | Freeman et al. |
| 2008/0249770 A1 | 10/2008 | Kim et al. |
| 2008/0300878 A1 | 12/2008 | Bennett |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0030800 A1 | 1/2009 | Grois |
| 2009/0030978 A1 | 1/2009 | Johnson et al. |
| 2009/0055179 A1 | 2/2009 | Cho et al. |
| 2009/0058823 A1 | 3/2009 | Kocienda |
| 2009/0076796 A1 | 3/2009 | Daraselia |
| 2009/0077165 A1 | 3/2009 | Rhodes et al. |
| 2009/0100049 A1 | 4/2009 | Cao |
| 2009/0106397 A1 | 4/2009 | O'Keefe |
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0138215 A1 | 6/2010 | Williams |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |

(56) References Cited

U.S. PATENT DOCUMENTS

| | | |
|---|---|---|
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | Lebeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0137367 A1 | 5/2012 | Dupont et al. |
| 2012/0173464 A1 | 7/2012 | Tur et al. |
| 2012/0265528 A1 | 10/2012 | Gruber et al. |
| 2012/0271676 A1 | 10/2012 | Aravamudan et al. |
| 2012/0311583 A1 | 12/2012 | Gruber et al. |
| 2013/0110518 A1 | 5/2013 | Gruber et al. |
| 2013/0110520 A1 | 5/2013 | Cheyer et al. |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 2 109 295 A1 | 10/2009 |
| GB | 2293667 A | 4/1996 |
| JP | 06 019965 | 1/1994 |
| JP | 2001 125896 | 5/2001 |
| JP | 2002 024212 | 1/2002 |
| JP | 2003 517158 A | 5/2003 |
| JP | 2009 036999 | 2/2009 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 00/60435 | 10/2000 |
| WO | WO 00/60435 A3 | 10/2000 |
| WO | WO 01/46946 A1 | 6/2001 |
| WO | WO 02/073603 A1 | 9/2002 |
| WO | WO 2006/129967 A1 | 12/2006 |
| WO | WO 2008/085742 A2 | 7/2008 |
| WO | WO 2008/109835 A2 | 9/2008 |
| WO | WO 2011/088053 A2 | 7/2011 |

OTHER PUBLICATIONS

Roddy, D., et al., "Communication and Collaboration in a Landscape of B2B eMarketplaces," VerticalNet Solutions, white paper, Jun. 15, 2000, 23 pages.

Alfred App, 2011, http://www.alfredapp.com/, 5 pages.

Ambite, JL., et al., "Design and Implementation of the CALO Query Manager," Copyright © 2006, American Association for Artificial Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Elio, R. et al., "On Abstract Task Models and Conversation Policies," http://webdocs.cs.ualberta.ca/~ree/publications/papers2/ATS.AA99.pdf, May 1999, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet Evi: the one mobile app that provides solutions for your everyday problems," Feb. 8, 2012, http://www.evi.com/, 3 pages.

(56) References Cited

OTHER PUBLICATIONS

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL1 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

(56) References Cited

OTHER PUBLICATIONS

Intraspect Software, "The Intraspect Knowledge Management Solution: Technical Overview," http://tomgruber.org/writing/intraspect-whitepaper-1998.pdf, 18 pages.
Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative Engineering," 1993, Journal of Concurrent Engineering: Applications and Research (CERA), 18 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
Microsoft/Ford, "Basic Sync Commands," www.SyncMyRide.com, Sep. 14, 2007, 1 page.
Milward, D., et al., "D2.2: Dynamic Multimodal Interface Reconfiguration, Talk and Look: Tools for Ambient Linguistic Knowledge," Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
Notice of Allowance dated Jul. 5, 2012, received in U.S. Appl. No. 12/686,774, 28 pages (Lindahl).
Office Action dated Jan. 26, 2012, received in U.S. Appl. No. 12/686,774, 25 pages (Lindahl).
Office Action dated Jul. 10, 2012, received in U.S. Appl. No. 12/617,307, 29 pages (Lindahl).
*Phoenix Solutions, Inc.* v. *West Interactive Corp.*, Document 40, Declaration of Christopher Schmandt Regarding the MIT Galaxy System dated Jul. 2, 2010, 162 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, (http://tomgruber.org/writing/ks1-95-69.pdf, Sep. 1995.) CHI '96 Proceedings: Conference on Human Factors in Computing Systems, Apr. 13-18, 1996, Vancouver, BC, Canada, 14 pages.
Rivlin, Z., et al., "Maestro: Conductor of Multimedia Analysis Technologies," 1999 SRI International, Communications of the Association for Computing Machinery (CACM), 7 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http:// www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakToIt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20, 1 page.
YouTube,"Send Text, Listen to and Send E-Mail 'By Voice' www.voiceassist.com," 2:11 minute video uploaded to YouTube by VoiceAssist on Jul 30, 2009, http://www.youtube.com/watch?v=0tEU61nHHA4, 1 page.
YouTube,"Text'nDrive App Demo—Listen and Reply to your Messages by Voice while Driving!," 1:57 minute video uploaded to YouTube by TextnDrive on Apr 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, © 1994 IEEE, 9 pages.
International Search Report and Written Opinion dated Nov. 29, 2011, received in International Application No. PCT/US2011/20861, which corresponds to U.S. Appl. No. 12/987,982, 15 pages. (Thomas Robert Gruber).
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by the Benjamin/Cummings Publishing Company, Inc., 671 pages.

(56) References Cited

OTHER PUBLICATIONS

Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in the Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z_1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.
Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.
Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright ©1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Bulyko, I. et al., "Error-Correction Detection and Response Generation in a Spoken Dialogue System," © 2004 Elsevier B.V., specom. 2004.09.009, 18 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Bussler, C., et al., "Web Service Execution Environment (WSMX)," Jun. 3, 2005, W3C Member Submission, http://www.w3.org/Submission/WSMX, 29 pages.
Carter, D., "Lexical Acquisition in the Core Language Engine," 1989, Proceedings of the Fourth Conference of the European Chapter of the Association for Computational Linguistics, 8 pages.

Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., "About Adam Cheyer," Sep. 17, 2012, http://www.adam.cheyer.com/about.html, 2 pages.
Cheyer, A., "A Perspective on AI & Agent Technologies for SCM," VerticalNet, 2001 presentation, 22 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Cox, R. V., et al., "Speech and Language Processing for Next-Millennium Communications Services," Proceedings of the IEEE, vol. 88, No. 8, Aug. 2000, 24 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Davis, Z., et al., "A Personal Handheld Multi-Modal Shopping Assistant," 2006 IEEE, 9 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding," 1993, Proceedings of the Thirty-First Annual Meeting of the Association for Computational Linguistics, 8 pages.
Dowding, J., et al., "Interleaving Syntax and Semantics in An Efficient Bottom-Up Parser," 1994, Proceedings of the 32nd Annual Meeting of the Association for Computational Linguistics, 7 pages.
Epstein, M., et al., "Natural Language Access to a Melanoma Data Base," Sep. 1978, SRI International, 7 pages.
Exhibit 1, "Natural Language Interface Using Constrained Intermediate Dictionary of Results," Classes/Subclasses Manually Reviewed for the Search of US Patent No. 7,177,798, Mar. 22, 2013, 1 page.
Exhibit 1, "Natural Language Interface Using Constrained Intermediate Dictionary of Results," List of Publications Manually reviewed for the Search of US Patent No. 7,177,798, Mar. 22, 2013, 1 page.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.

(56) References Cited

OTHER PUBLICATIONS

Fikes, R., et al., "A Network-based knowledge Representation and its Natural Deduction System," Jul. 1977, SRI International, 43 pages.
Gambäck, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems-Association for Information Systems, 3 pages.
Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "TEAM: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trier.de/~ley/pers/hd/g/Guzzoni:Didier.
Guzzoni, D., "Active: A unified platform for building intelligent assistant applications," Oct. 25, 2007, 262 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.
Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages. Best Copy Available.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of EUROSPEECH, 4 pages.
Issar, S., "Estimation of Language Models for New Spoken Language Applications," Oct. 3-6, 1996, Proceedings of 4th International Conference on Spoken language Processing, Philadelphia, 4 pages.
Janas, J., "The Semantics-Based Natural Language Interface to Relational Databases," © Springer-Verlag Berlin Heidelberg 1986, Germany, 48 pages.
Johnson, J., "A Data Management Strategy for Transportable Natural Language Interfaces," Jun. 1989, doctoral thesis submitted to the Department of Computer Science, University of British Columbia, Canada, 285 pages.
Julia, L., et al., "http://www.speech.sri.com/demos/atis.html," 1997, Proceedings of AAAI, Spring Symposium, 5 pages.
Kahn, M., et al., "CoABS Grid Scalability Experiments," 2003, Autonomous Agents and Multi-Agent Systems, vol. 7, 8 pages.
Kamel, M., et al., "A Graph Based Knowledge Retrieval System," © 1990 IEEE, 7 pages.
Katz, B., "Annotating the World Wide Web Using Natural Language," 1997, Proceedings of the 5th RIAO Conference on Computer Assisted Information Searching on the Internet, 7 pages.
Katz, B., "A Three-Step Procedure for Language Generation," Dec. 1980, Massachusetts Institute of Technology, Artificial Intelligence Laboratory, 42 pages.
Katz, B., et al., "Exploiting Lexical Regularities in Designing Natural Language Systems," 1988, Proceedings of the 12th International Conference on Computational Linguistics, Coling'88, Budapest, Hungary, 22 pages.
Katz, B., et al., "REXTOR: A System for Generating Relations from Natural Language," In Proceedings of the ACL Oct. 2000 Workshop on Natural Language Processing and Information Retrieval (NLP &IR), 11 pages.
Katz, B., "Using English for Indexing and Retrieving," 1988 Proceedings of the 1st RIAO Conference on User-Oriented Content-Based Text and Image (RIAO'88), 19 pages.
Konolige, K., "A Framework for a Portable Natural=Language Interface to Large Data Bases," Oct. 12, 1979, SRI International, Artificial Intelligence Center, 54 pages.
Laird, J., et al., "SOAR: An Architecture for General Intelligence," 1987, Artificial Intelligence vol. 33, 64 pages.
Larks, "Intelligent Software Agents: Larks," 2006, downloaded on Mar. 15, 2013 from http://www.cs.cmu.edu/larks.html, 2 pages.
Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.
Martin, D., et al., "Development Tools for the Open Agent Architecture," Apr. 1996, Proceedings of the International Conference on the Practical Application of Intelligent Agents and Multi-Agent Technology, 17 pages.
Martin, D., et al., "Information Brokering in an Agent Architecture," Apr. 1997, Proceedings of the second International Conference on the Practical Application of Intelligent Agents and Multi-Agent Technology, 20 pages.
Martin, D., et al., "PAAM '98 Tutorial: Building and Using Practical Agent Applications," 1998, SRI International, 78 pages.

(56) References Cited

OTHER PUBLICATIONS

Martin, P., et al., "Transportability and Generality in a Natural-Language Interface System," Aug. 8-12, 1983, Proceedings of the Eight International Joint Conference on Artificial Intelligence, West Germany, 21 pages.

Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.

Michos, S.E., et al., "Towards an adaptive natural language interface to command languages," Natural Language Engineering 2 (3), © 1994 Cambridge University Press, 19 pages. Best Copy Available.

Milstead, J., et al., "Metadata: Cataloging by Any Other Name . . ." Jan. 1999, Online, Copyright © 1999 Information Today, Inc., 18 pages.

Minker, W., et al., "Hidden Understanding Models for Machine Translation," 1999, Proceedings of ETRW on Interactive Dialogue in Multi-Modal Systems, 4 pages.

Modi, P. J., et al., "CMRadar: A Personal Assistant Agent for Calendar Management," © 2004, American Association for Artificial Intelligence, Intelligent Systems Demonstrations, 2 pages.

Moore, R., et al., "Combining Linguistic and Statistical Knowledge Sources in Natural-Language Processing for ATIS," 1995, SRI International, Artificial Intelligence Center, 4 pages.

Moore, R., "Handling Complex Queries in a Distributed Data Base," Oct. 8, 1979, SRI International, Artificial Intelligence Center, 38 pages.

Moore, R., "Practical Natural-Language Processing by Computer," Oct. 1981, SRI International, Artificial Intelligence Center, 34 pages.

Moore, R., et al., "SRI's Experience with the ATIS Evaluation," Jun. 24-27, 1990, Proceedings of a workshop held at Hidden Valley, Pennsylvania, 4 pages. Best Copy Available.

Moore, et al., "The Information Warefare Advisor: An Architecture for Interacting with Intelligent Agents Across the Web," Dec. 31, 1998 Proceedings of Americas Conference on Information Systems (AMCIS), 4 pages.

Moore, R., "The Role of Logic in Knowledge Representation and Commonsense Reasoning," Jun. 1982, SRI International, Artificial Intelligence Center, 19 pages.

Moore, R., "Using Natural-Language Knowledge Sources in Speech Recognition," Jan. 1999, SRI International, Artificial Intelligence Center, 24 pages.

Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.

Moran, D., "Quantifier Scoping in the SRI Core Language Engine," 1988, Proceedings of the 26th annual meeting on Association for Computational Linguistics, 8 pages.

Motro, A., "Flex: A Tolerant and Cooperative User Interface to Databases," IEEE Transactions on Knowledge and Data Engineering, vol. 2, No. 2, Jun. 1990, 16 pages.

Murveit, H., et al., "Speech Recognition in SRI's Resource Management and ATIS Systems," 1991, Proceedings of the workshop on Speech and Natural Language (HTL'91), 7 pages.

OAA, "The Open Agent Architecture 1.0 Distribution Source Code," Copyright 1999, SRI International, 2 pages.

Odubiyi, J., et al., "SAIRE—a scalable agent-based information retrieval engine," 1997 Proceedings of the First International Conference on Autonomous Agents, 12 pages.

Owei, V., et al., "Natural Language Query Filtration in the Conceptual Query Language," © 1997 IEEE, 11 pages.

Pannu, A., et al., "A Learning Personal Agent for Text Filtering and Notification," 1996, The Robotics Institute School of Computer Science, Carnegie-Mellon University, 12 pages.

Pereira, "Logic for Natural Language Analysis," Jan. 1983, SRI International, Artificial Intelligence Center, 194 pages.

Perrault, C.R., et al., "Natural-Language Interfaces," Aug. 22, 1986, SRI International, 48 pages.

Pulman, S.G., et al., "Clare: A Combined Language and Reasoning Engine," 1993, Proceedings of JFIT Conference, 8 pages. URL: http://www.cam.sri.com/tr/crc042/paper.ps.Z.

Ravishankar, "Efficient Algorithms for Speech Recognition," May 15, 1996, Doctoral Thesis submitted to School of Computer Science, Computer Science Division, Carnegie Mellon University, Pittsburg, 146 pages.

Rayner, M., et al., "Adapting the Core Language Engine to French and Spanish," May 10, 1996, Cornell University Library, 9 pages. http://arxiv.org/abs/cmp-lg/9605015.

Rayner, M., "Abductive Equivalential Translation and its application to Natural Language Database Interfacing," Sep. 1993 Dissertation paper, SRI International, 163 pages.

Rayner, M., et al., "Deriving Database Queries from Logical Forms by Abductive Definition Expansion," 1992, Proceedings of the Third Conference on Applied Natural Language Processing, ANLC'92, 8 pages.

Rayner, M., "Linguistic Domain Theories: Natural-Language Database Interfacing from First Principles," 1993, SRI International, Cambridge, 11 pages.

Rayner, M., et al., "Spoken Language Translation With Mid-90's Technology: A Case Study," 1993, EUROSPEECH, ISCA, 4 pages. http://dblp.uni-trier.de/db/conf/interspeech/eurospeech1993.html#RaynerBCCDGKKLPPS93.

Roddy, D., et al., "Communication and Collaboration in a Landscape of B2B eMarketplaces," VerticalNet Solutions, white paper, Jun. 15, 2000, 24 pages.

Russell, S., et al., "Artificial Intelligence, A Modern Approach," © 1995 Prentice Hall, Inc., 121 pages.

Sacerdoti, E., et al., "A Ladder User's Guide (Revised)," Mar. 1980, SRI International, Artificial Intelligence Center, 39 pages.

Sagalowicz, D., "A D-Ladder User's Guide," Sep. 1980, SRI International, 42 pages.

Sameshima, Y., et al., "Authorization with security attributes and privilege delegation Access control beyond the ACL," Computer Communications, vol. 20, 1997, 9 pages.

San-Segundo, R., et al., "Confidence Measures for Dialogue Management in the CU Communicator System," Jun. 5-9, 2000, Proceedings of Acoustics, Speech, and Signal Processing (ICASSP'00), 4 pages.

Sato, H., "A Data Model, Knowledge Base, and Natural Language Processing for Sharing a Large Statistical Database," 1989, Statistical and Scientific Database Management, Lecture Notes in Computer Science, vol. 339, 20 pages.

Schnelle, D., "Context Aware Voice User Interfaces for Workflow Support," Aug. 27, 2007, Dissertation paper, 254 pages.

Sharoff, S., et al., "Register-domain Separation as a Methodology for Development of Natural Language Interfaces to Databases," 1999, Proceedings of Human-Computer Interaction (INTERACT'99), 7 pages.

Shimazu, H., et al., "CAPIT: Natural Language Interface Design Tool with Keyword Analyzer and Case-Based Parser," NEC Research & Development, vol. 33, No. 4, Oct. 1992, 11 pages.

Shinkle, L., "Team User's Guide," Nov. 1984, SRI International, Artificial Intelligence Center, 78 pages.

Shklar, L., et al., "Info Harness: Use of Automatically Generated Metadata for Search and Retrieval of Heterogeneous Information," 1995 Proceedings of CAiSE'95, Finland.

Singh, N., "Unifying Heterogeneous Information Models," 1998 Communications of the ACM, 13 pages.

SRI2009, "SRI Speech: Products: Software Development Kits: EduSpeak," 2009, 2 pages, available at http://web.archive.org/web/20090828084033/http://www.speechatsri.com/products/eduspeak.shtml.

Starr, B., et al., "Knowledge-Intensive Query Processing," May 31, 1998, Proceedings of the 5th KRDB Workshop, Seattle, 6 pages.

Stern, R., et al. "Multiple Approaches to Robust Speech Recognition," 1992, Proceedings of Speech and Natural Language Workshop, 6 pages.

Stickel, "A Nonclausal Connection-Graph Resolution Theorem-Proving Program," 1982, Proceedings of AAAI'82, 5 pages.

(56) References Cited

OTHER PUBLICATIONS

Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments ," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the Tacitus Natural Language System," May 1990, SRI International, Artificial Intelligence Center, 16 pages.
Wahlster, W., et al., "Smartkom: multimodal communication with a life-like character," 2001 EUROSPEECH—Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages. Best Copy Available.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of The Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley. EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris—France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.

(56) References Cited

OTHER PUBLICATIONS

Bellegarda, J. R., "A Multispan Language Modeling Framework for Large Vocabulary Speech Recognition," IEEE Transactions on Speech and Audio Processing, vol. 6, No. 5, Sep. 1998, 12 pages.

Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.

Bellegarda, J. R., et al., "Experiments Using Data Augmentation for Speaker Adaptation," International Conference on Acoustics, Speech, and Signal Processing (ICASSP'95), May 9-12, 1995, 4 pages.

Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.

Bellegarda, J. R., "Exploiting Latent Semantic Information in Statistical Language Modeling," In Proceedings of the IEEE, Aug. 2000, vol. 88, No. 8, 18 pages.

Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.

Bellegarda, J. R., "Large Vocabulary Speech Recognition with Multispan Statistical Language Models," IEEE Transactions on Speech and Audio Processing, vol. 8, No. 1, Jan. 2000, 9 pages.

Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.

Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.

Black, A. W., et al., "Automatically Clustering Similar Units for Unit Selection in Speech Synthesis," In Proceedings of Eurospeech 1997, vol. 2, 4 pages.

Blair, D. C., et al., "An Evaluation of Retrieval Effectiveness for a Full-Text Document-Retrieval System," Communications of the ACM, vol. 28, No. 3, Mar. 1985, 11 pages.

Briner, L. L., "Identifying Keywords in Text Data Processing," In Zelkowitz, Marvin V., ED, Directions and Challenges, 15th Annual Technical Symposium, Jun. 17, 1976, Gaithersbury, Maryland, 7 pages.

Bulyko, I., et al., "Joint Prosody Prediction and Unit Selection for Concatenative Speech Synthesis," Electrical Engineering Department, University of Washington, Seattle, 2001, 4 pages.

Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.

Buzo, A., et al., "Speech Coding Based Upon Vector Quantization," IEEE Transactions on Acoustics, Speech, and Signal Processing, vol. Assp-28, No. 5, Oct. 1980, 13 pages.

Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.

Cawley, G. C., "The Application of Neural Networks to Phonetic Modelling," PhD Thesis, University of Essex, Mar. 1996, 13 pages.

Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.

Conklin, J., "Hypertext: An Introduction and Survey," COMPUTER Magazine, Sep. 1987, 25 pages.

Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.

Deerwester, S., et al., "Indexing by Latent Semantic Analysis," Journal of the American Society for Information Science, vol. 41, No. 6, Sep. 1990, 19 pages.

Deller, Jr., J. R., et al., "Discrete-Time Processing of Speech Signals," © 1987 Prentice Hall, ISBN: 0-02-328301-7, 14 pages.

Digital Equipment Corporation, "Open VMS Software Overview," Dec. 1995, software manual, 159 pages.

Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.

Frisse, M. E., "Searching for Information in a Hypertext Medical Handbook," Communications of the ACM, vol. 31, No. 7, Jul. 1988, 8 pages.

Goldberg, D., et al., "Using Collaborative Filtering to Weave an Information Tapestry," Communications of the ACM, vol. 35, No. 12, Dec. 1992, 10 pages.

Gorin, A. L., et al., "On Adaptive Acquisition of Language," International Conference on Acoustics, Speech, and Signal Processing (ICASSP'90), vol. 1, Apr. 3-6, 1990, 5 pages.

Gotoh, Y., et al., "Document Space Models Using Latent Semantic Analysis," In Proceedings of Eurospeech, 1997, 4 pages.

Gray, R. M., "Vector Quantization," IEEE ASSP Magazine, Apr. 1984, 26 pages.

Harris, F. J., "On the Use of Windows for Harmonic Analysis with the Discrete Fourier Transform," In Proceedings of the IEEE, vol. 66, No. 1, Jan. 1978, 34 pages.

Helm, R., et al., "Building Visual Language Parsers," In Proceedings of CHI'91 Proceedings of the SIGCHI Conference on Human Factors in Computing Systems, 8 pages.

Hermansky, H., "Perceptual Linear Predictive (PLP) Analysis of Speech," Journal of the Acoustical Society of America, vol. 87, No. 4, Apr. 1990, 15 pages.

Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.

Hoehfeld M., et al., "Learning with Limited Numerical Precision Using the Cascade-Correlation Algorithm," IEEE Transactions on Neural Networks, vol. 3, No. 4, Jul. 1992, 18 pages.

Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.

Hon, H.W., et al., "CMU Robust Vocabulary-Independent Speech Recognition System," IEEE International Conference on Acoustics, Speech, and Signal Processing (ICASSP—91), Apr. 14-17, 1991, 4 pages.

IBM Technical Disclosure Bulletin, "Speech Editor," vol. 29, No. 10, Mar. 10, 1987, 3 pages.

IBM Technical Disclosure Bulletin, "Integrated Audio-Graphics User Interface," vol. 33, No. 11, Apr. 1991, 4 pages.

IBM Technical Disclosure Bulletin, "Speech Recognition with Hidden Markov Models of Speech Waveforms," vol. 34, No. 1, Jun. 1991, 10 pages.

Iowegian International, "FIR Filter Properties," dspGuro, Digital Signal Processing Central, http://www.dspguru.com/dsp/tags/fir/properties, downloaded on Jul. 28, 2010, 6 pages.

Jacobs, P. S., et al., "Scisor: Extracting Information from On-Line News," Communications of the ACM, vol. 33, No. 11, Nov. 1990, 10 pages.

Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.

Jennings, A., et al., "A Personal News Service Based on a User Model Neural Network," IEICE Transactions on Information and Systems, vol. E75-D, No. 2, Mar. 1992, Tokyo, JP, 12 pages.

Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.

(56) References Cited

OTHER PUBLICATIONS

Jones, J., "Speech Recognition for Cyclone," Apple Computer, Inc., E.R.S., Revision 2.9, Sep. 10, 1992, 93 pages.

Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.

Kitano, H., "PhiDM-Dialog, an Experimental Speech-to-Speech Dialog Translation System," Jun. 1991 COMPUTER, vol. 24, No. 6, 13 pages.

Klabbers, E., et al., "Reducing Audible Spectral Discontinuities," IEEE Transactions on Speech and Audio Processing, vol. 9, No. 1, Jan. 2001, 13 pages.

Klatt, D. H., "Linguistic Uses of Segmental Duration in English: Acoustic and Perpetual Evidence," Journal of the Acoustical Society of America, vol. 59, No. 5, May 1976, 16 pages.

Kominek, J., et al., "Impact of Durational Outlier Removal from Unit Selection Catalogs," 5th ISCA Speech Synthesis Workshop, Jun. 14-16, 2004, 6 pages.

Kubala, F., et al., "Speaker Adaptation from a Speaker-Independent Training Corpus," International Conference on Acoustics, Speech, and Signal Processing (ICASSP'90), Apr. 3-6, 1990, 4 pages.

Kubala, F., et al., "The Hub and Spoke Paradigm for CSR Evaluation," Proceedings of the Spoken Language Technology Workshop, Mar. 6-8, 1994, 9 pages.

Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.

Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.

Lee, L, et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.

Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.

Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.

Lin, C.H., et al., "A New Framework for Recognition of Mandarin Syllables With Tones Using Sub-syllabic Unites," IEEE International Conference on Acoustics, Speech, and Signal Processing (ICASSP—93), Apr. 27-30, 1993, 4 pages.

Linde, Y., et al., "An Algorithm for Vector Quantizer Design," IEEE Transactions on Communications, vol. 28, No. 1, Jan. 1980, 12 pages.

Liu, F.H., et al., "Efficient Joint Compensation of Speech for the Effects of Additive Noise and Linear Filtering," IEEE International Conference of Acoustics, Speech, and Signal Processing, ICASSP—92, Mar. 23-26, 1992, 4 pages.

Logan, B., "Mel Frequency Cepstral Coefficients for Music Modeling," In International Symposium on Music Information Retrieval, 2000, 2 pages.

Lowerre, B. T., "The-HARPY Speech Recognition System," Doctoral Dissertation, Department of Computer Science, Carnegie Mellon University, Apr. 1976, 20 pages.

Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright @ 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.

Papadimitriou, C. H., et al., "Latent Semantic Indexing: A Probabilistic Analysis," Nov. 14, 1997, http://citeseerx.ist.psu.edu/messages/downloadsexceeded.html, 21 pages.

Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

Remde, J. R., et al., "SuperBook: An Automatic Tool for Information Exploration-Hypertext?," In Proceedings of Hypertext'87 papers, Nov. 13-15, 1987, 14 pages.

Reynolds, C. F., "On-Line Reviews: A New Application of the HICOM Conferencing System," IEE Colloquium on Human Factors in Electronic Mail and Conferencing Systems, Feb. 3, 1989, 4 pages.

Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.

Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.

Rivoira, S., et al., "Syntax and Semantics in a Word-Sequence Recognition System," IEEE International Conference on Acoustics, Speech, and Signal Processing (ICASSP'79), Apr. 1979, 5 pages.

Rosenfeld, R., "A Maximum Entropy Approach to Adaptive Statistical Language Modelling," Computer Speech and Language, vol. 10, No. 3, Jul. 1996, 25 pages.

Roszkiewicz, A., "Extending your Apple," Back Talk—Lip Service, A+ Magazine, The Independent Guide for Apple Computing, vol. 2, No. 2, Feb. 1984, 5 pages.

Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.

Salton, G., et al., "On the Application of Syntactic Methodologies in Automatic Text Analysis," Information Processing and Management, vol. 26, No. 1, Great Britain 1990, 22 pages.

Savoy, J., "Searching Information in Hypertext Systems Using Multiple Sources of Evidence," International Journal of Man-Machine Studies, vol. 38, No. 6, Jun. 1993, 15 pages.

Scagliola, C., "Language Models and Search Algorithms for Real-Time Speech Recognition," International Journal of Man-Machine Studies, vol. 22, No. 5, 1985, 25 pages.

(56) References Cited

OTHER PUBLICATIONS

Schmandt, C., et al., "Augmenting a Window System with Speech Input," IEEE Computer Society, Computer Aug. 1990, vol. 23, No. 8, 8 pages.
Schütze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19 1999, 5 pages.
Tenenbaum, A.M., et al., "Data Structure Using Pascal," 1981 Prentice-Hall, Inc., 34 pages.
Tsai, W.H., et al., "Attributed Grammar-A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," COMPUTER Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).
International Preliminary Examination Report dated Apr. 10, 1995, received in International Application No. PCT/US1993/12637, which corresponds to U.S. Appl. No. 07/999,354, 7 pages (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).

DEVICES AND METHODS FOR IDENTIFYING A PROMPT CORRESPONDING TO A VOICE INPUT IN A SEQUENCE OF PROMPTS

RELATED APPLICATION

This is a continuation of U.S. patent application Ser. No. 12/686,774, filed Jan. 13, 2010, now U.S. Pat. No. 8,311,838 entitled "Processing of Voice Inputs" which is incorporated by reference herein in its entirety.

BACKGROUND

This is directed to processing voice inputs received by an electronic device in response to consecutively provided prompts. In particular, this is directed to identifying the prompt with which a particular received voice input is associated.

Many electronic devices provide a significant number of features or operations accessible to a user. The number of available features or operations may often exceed the number of inputs available using an input interface of the electronic device. To allow users to access electronic device operations that are not specifically tied to particular inputs (e.g., inputs not associated with a key sequence or button press, such as a MENU button on an iPod, available from Apple Inc.), the electronic device may provide menus with selectable options, where the options are associated with electronic device operations. For example, an electronic device may display a menu with selectable options on a display, for example in response to receiving an input associated with the menu from an input interface (e.g., a MENU button).

Because the menu is typically displayed on an electronic device display, a user may be required to look at the display to select a particular option. This may sometimes not be desirable. For example, if a user desires to conserve power (e.g., in a portable electronic device), requiring the electronic device to display a menu and move a highlight region navigated by the user to provide a selection may require power that could be saved by not driving the display. As another example, if a user is in a dark environment and the display does not include back lighting, the user may not be able to distinguish displayed options of the menu. As still another example, if a user is blind or visually impaired, the user may not be able to view a displayed menu.

To overcome this issue, some systems may allow users to provide instructions by voice. In particular, the electronic device can include audio input circuitry for detecting words spoken by a user. Processing circuitry of the device can then process the words to identify a corresponding instruction to the electronic device, and execute the corresponding instruction. To process received voice inputs, the electronic device can determine the content of a voice input and an instruction corresponding to the content.

In some cases, however, a voice input can be received in response to a prompt provided by the device. For example, the voice input can be provided while the electronic device provides a voice prompt or voice over describing a particular selectable option. As another example, the voice input can be provided while the electronic device displays a series of selectable options in sequence. Because of the time required to receive an entire voice input, process the voice input, and determine the content of the voice input, a particular voice input that a user provided in response to a first prompt can be processed and understood after the first prompt has ended and while a second prompt is provided. The device can then have difficulty determining which prompt to associate with the received voice input.

SUMMARY

This is directed to systems and methods for processing voice inputs received while a sequence of prompts corresponding to selectable options are provided. In particular, this is directed to identifying a particular prompt to associate with a received voice input.

An electronic device can provide a sequence of prompts to a user, where each prompt is associated with an electronic device operation that the user can select. The prompts can be provided using any suitable approach, including for example as displayed prompts, audio prompts, or haptic prompts. When a prompt of interest to the user is provided, the user can provide an input to the device to direct the device to perform the operation associated with the prompt.

The user can provide an input to the device using any suitable approach. In some embodiments, the user can provide a voice input. Because the voice input can require a particular duration to be received in its entirety and then processed to determine its contents, several prompts can be provided in the time it takes a voice input to be received and processed. The electronic device can then be required to determine which of the provided prompts to relate to the voice input. In some embodiments, the electronic device can define an input window or duration associated with each of the prompts, such that the input window or duration can specify a particular time frame during which received voice inputs relate to the corresponding prompt. The input window or duration can have any suitable length (e.g., the amount of time the prompt is provided), and can be offset from the time at which the prompt is provided (e.g., the input window follows the prompt offset by 2 seconds). In some cases, different prompts can have variable input window sizes or lengths, for example based on the relative importance or likelihood of selection of each prompt, or on the length of a particular prompt (e.g., the duration a prompt is provided by the device).

To relate voice inputs to prompts, the electronic device can associate a characteristic time with a received voice input. The characteristic time can then be compared to the input windows of the prompts to determine which input window includes the characteristic time. The electronic device can then determine or deduce that the prompt corresponding to the input window that includes the characteristic time was the one of interest to the user. The characteristic time can include any suitable time or range of times during which the voice input was received. For example, the characteristic time can include the initial time at which the voice input was received, a time offset from the initial time, or any other suitable time.

In some embodiments, input windows or durations from consecutively provided prompts can overlap (e.g., if one of the prompts is more important and has an expanded input window). If a characteristic time associated with a voice input is included in overlapping input windows or durations, the electronic device can identify one or more additional characteristic times to associate with the voice input. The electronic device can then select the particular input window and corresponding prompt that include both the original characteristic time as well as the one or more additional characteristic times.

The electronic device can process a received voice input to extract an instruction associated with the voice input. The electronic device can then apply the extracted instruction to the one or more device operations associated with the prompt corresponding to the received voice input. In some embodiments, the device operation can be characterized or modified by a variable or value determined from the extracted instruction (e.g., a media item to serve as a seed to define a new media playlist). In some embodiments, the processed voice input can instead or in addition be used to identify the particular prompt with which the voice input is associated (e.g., a voice input directing the device to perform a specific operation associated with a provided prompt).

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

An electronic device can be operative to receive voice inputs provided by a user to control electronic device operations. In some cases, the voice input provided can correspond to a prompt from the electronic device, including for example one of a series of prompts provided in sequence.

An electronic device can prompt a user to interact with the device using any suitable approach. In some embodiments, an electronic device can provide one or more prompts, each associated with a device operation or instruction, that the user can select to direct the device to perform an operation. For example, the electronic device can provide voice over prompts for controlling media playback. As another example, the electronic device can provide displayed prompts listing applications that the electronic device can launch. Each prompt can be provided for a particular duration, and subsequently replaced by the next prompt in a queue.

In response to detecting a prompt for an operation desired by the user, the user can provide a voice input directing the device to perform the operation or instruction associated with the current prompt. Due to the length of the voice input and the time required to process the voice input, the electronic device may finish processing an input while a subsequent prompt in the sequence is being provided. To prevent the device from incorrectly determining that the prompt provided at the time the voice input processing ends is associated with the voice input, the electronic device can define one or more time stamps or time ranges associated with each prompt. When a voice input is initially provided or is completed by a particular time stamp, or within a particular time range (e.g., as set by a characteristic time of the voice input), the electronic device can associate the voice input with a corresponding prompt. In particular, the time stamps or time ranges can be defined such that a voice input processed after a prompt ends can still be associated with a prior prompt.

Each prompt can be associated with any suitable combination of time stamps or time ranges. For example, a prompt can be associated with a time range that extends beyond the time during which the prompt is provided. In some cases, the time stamps and time ranges associated with particular prompts can change dynamically based on the user's history of selecting prompts, the types of prompts, or any other characteristics of the user's voice inputs or of the prompts.

Figure 1:
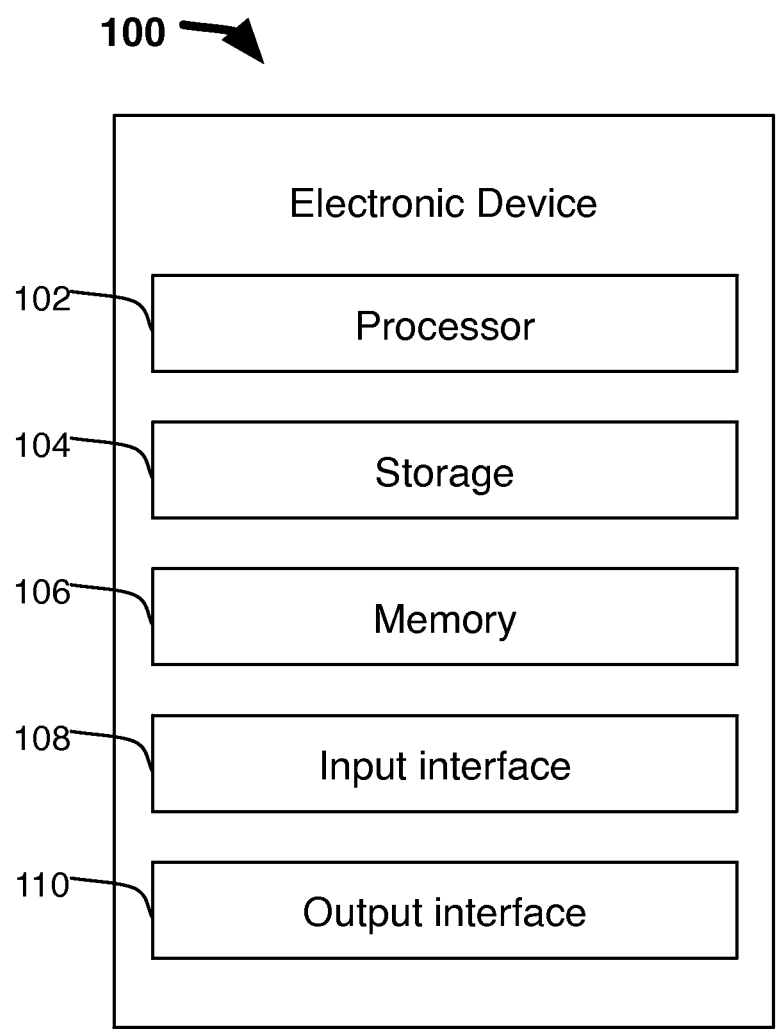
FIG. 1 is a schematic view of an electronic device in accordance with one embodiment of the invention.

FIG. 1 is a schematic view of an electronic device in accordance with one embodiment of the invention. Electronic device 100 may include processor 102, storage 104, memory 106, input interface 108, and output interface 110. In some embodiments, one or more of electronic device components 100 may be combined or omitted (e.g., combine storage 104 and memory 106). In some embodiments, electronic device 100 may include other components not combined or included in those shown in FIG. 1 (e.g., communications circuitry, location circuitry, sensing circuitry detecting the device environment, a power supply, or a bus), or several instances of the components shown in FIG. 1. For the sake of simplicity, only one of each of the components is shown in FIG. 1.

Processor 102 may include any processing circuitry or control circuitry operative to control the operations and performance of electronic device 100. For example, processor 102 may be used to run operating system applications, firmware applications, media playback applications, media editing applications, or any other application. In some embodiments, a processor may drive a display and process inputs received from a user interface.

Storage 104 may include, for example, one or more storage mediums including a hard-drive, solid state drive, flash memory, permanent memory such as ROM, any other suitable type of storage component, or any combination thereof. Storage 104 may store, for example, media data (e.g., music and video files), application data (e.g., for implementing functions on device 100), firmware, user preference information (e.g., media playback preferences), authentication information (e.g. libraries of data associated with authorized users), lifestyle information (e.g., food preferences), exercise information (e.g., information obtained by exercise monitoring equipment), transaction information (e.g., information such as credit card information), wireless connection information (e.g., information that may enable electronic device 100 to establish a wireless connection), subscription information (e.g., information that keeps track of podcasts or television shows or other media a user subscribes to), contact information (e.g., telephone numbers and email addresses), calendar information, and any other suitable data or any combination thereof.

Memory 106 can include cache memory, semi-permanent memory such as RAM, and/or one or more different types of memory used for temporarily storing data. In some embodiments, memory 106 can also be used for storing data used to operate electronic device applications, or any other type of data that may be stored in storage 104. In some embodiments, memory 106 and storage 104 may be combined as a single storage medium.

Input interface 108 may provide inputs to input/output circuitry of the electronic device. Input interface 108 may include any suitable input interface, such as for example, a button, keypad, dial, a click wheel, or a touch screen. In some embodiments, electronic device 100 may include a capacitive sensing mechanism, or a multi-touch capacitive sensing mechanism. In some embodiments, input interface can include a microphone or other audio input interface for receiving a user's voice inputs. The input interface can include an analog to digital converter for converting received analog signals corresponding to a voice input to a digital signal that can be processed and analyzed to identify specific words or instructions.

Output interface 110 may include one or more interfaces for providing an audio output, visual output, or other type of output (e.g., odor, taste or haptic output). For example, output interface 110 can include one or more speakers (e.g., mono or stereo speakers) built into electronic device 100, or an audio connector (e.g., an audio jack or an appropriate Bluetooth connection) operative to be coupled to an audio output mechanism. Output interface 110 may be operative to provide audio data using a wired or wireless connection to a headset, headphones or earbuds. As another example, output interface 110 can include display circuitry (e.g., a screen or projection system) for providing a display visible to the user. The display can include a screen (e.g., an LCD screen) that is incorporated in electronic device 100, a movable display or a projecting system for providing a display of content on a surface remote from electronic device 100 (e.g., a video projector), or any other suitable display. Output interface 110 can interface with the input/output circuitry (not shown) to provide outputs to a user of the device.

In some embodiments, electronic device 100 may include a bus operative to provide a data transfer path for transferring data to, from, or between control processor 102, storage 104, memory 106, input interface 108, output interface 110, and any other component included in the electronic device.

A user can interact with the electronic device using any suitable approach. In some embodiments, the user can provide inputs using one or more fingers touching an input interface, such as a keyboard, button, mouse, or touch-sensitive surface. In some embodiments, a user can instead or in addition provide an input by shaking or moving the electronic device in a particular manner (e.g., such that a motion sensing component of the input interface detects the user movement). In some embodiments, a user can instead or in addition provide a voice input to the electronic device. For example, the user can speak into a microphone embedded in or connected to the electronic device.

The user can provide voice inputs to the electronic device at any suitable time. In some embodiments, the electronic device can continuously monitor for voice inputs (e.g., when the device is not in sleep mode, or at all times). In some embodiments, the electronic device can monitor for voice inputs in response to a user input or instruction to enter a voice input. For example, a user can select a button or option, or place the electronic device in such a manner that a sensor detects that the user wishes to provided a voice input (e.g., a proximity sensor detects that the user has brought the device up to the user's mouth). In some embodiments, the electronic device can monitor for user inputs when one or more particular applications or processes are running on the device. For example, the electronic device can monitor for voice inputs in a media playback application, a voice control application, a searching application, or any other suitable application.

In one implementation, the electronic device can provide selectable prompts to the user, and can monitor for voice inputs or other types of inputs responsive to the prompts. The electronic device can provide any suitable type of prompts, including for example one or more of visual prompts (e.g., provided on a display), audio prompts (e.g., output by an audio output interface), haptic prompts (e.g., using a vibrating mechanism within the device), or any other suitable type of prompt. For example, an electronic device that does not include a visual or display output interface (e.g., an iPod Shuffle, available from Apple Inc.) can provide an audio menu that includes a succession of prompts each associated with a device operation. In one implementation, the audio menu can include audio prompts for creating a new playlist, selecting an existing playlist, selecting media items by artist, album or title, or any other instruction or operation related to controlling media playback on a device having no display. The prompts provided by the user can automatically cycle at a particular rate, such that each prompt is provided for a particular duration (e.g., the duration required for a voice output corresponding to the content of a prompt).

The user can provide an input selecting one of the prompts using any suitable approach. In some embodiments, the user can provide an input using an input interface of the device, such as a button or touch sensitive surface. The user can provide the input by interacting with the input interface (e.g., performing a gesture or pressing a button). When the input is short, such that the electronic device can receive and process an input within the duration of the prompt, a user can more easily select a prompt and receive feedback indicating that the proper prompt was selected.

Some inputs provided by a user may require a longer amount of time to be received and processed. For example, the duration required for receiving and processing a voice input can be longer than the duration required for receiving and processing a button press or accelerometer output. In particular, the duration can be so long that the electronic device can provide a first prompt when the voice input is initially received, and a second prompt when the voice input is finally processed. The electronic device may then need to determine which of the first and second prompts to associate with the received voice input.

Figure 2:
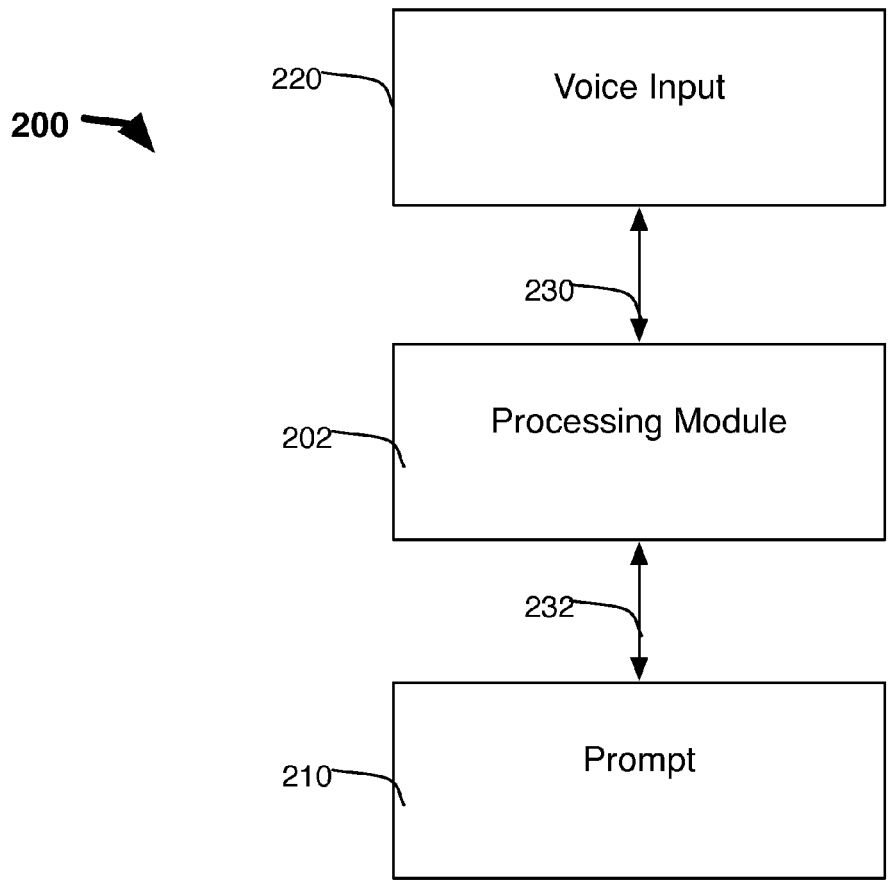
FIG. 2 is a schematic view of an illustrative system for processing voice inputs received as prompts are sequentially provided in accordance with one embodiment of the invention.

FIG. 2 is a schematic view of an illustrative system for processing voice inputs received as prompts are sequentially provided in accordance with one embodiment of the invention. System 200 can include processing module 202 connected to prompt 210 and voice input 220 via paths 230 and 232. Processing module 210 can be included in an electronic device (e.g., electronic device 100, FIG. 1) as any suitable combination of hardware, firmware and software. For example, processing module 210 can be provided as code directing operations of control circuitry or of a processor. Processing module 210 can provide a series of prompts 210 in sequence to a user of a device (e.g., using an output interface). For example, in response to a user request to enter a menu, processing module 202 can identify a set of prompts related to or corresponding with instructions or operations that relate to the menu, and can direct an output interface to provide the prompts. The prompts can be provided in any suitable form, including for example as visual prompts (e.g., displayed selectable options), audio prompts (e.g., voice over options), haptic prompts (e.g., vibrations corresponding to messages), or any other form.

Processing module 202 can identify any suitable number of prompts to provide, including for example a number determined from content available to the electronic device. For example, processing module 202 can provide prompts for each playlist stored on the device, or for each artist of media items stored on the device. The prompts can be provided using any suitable approach. For example, individual prompts can be provided sequence, such that only a single prompt is provided at a particular time. Alternatively, processing module 202 can simultaneously provide several prompts. In some embodiments, processing module 202 can provide prompts 210 such that one or more different prompts are provided at different moments of time. In particular, processing module 202 can cycle through different sets of prompts 210 (e.g., cycle through individually provided prompts, or cycle through sets of prompts that are provided) such that the user can select a different prompt at different times.

When a user detects that a prompt of interest is provided, the user can provide voice input 220 to processing module 202. Voice input 220 can have any suitable content, including for example content indicating a selection of the prompt of interest. Processing module 202 can receive voice input 220, and process the voice input to identify the particular words or phrases of the input. Processing module 202 can process the voice input using any suitable approach, including for example by comparing received voice input 220 to a library of known words and determining the meaning of the combination of identified library words or phrases. By processing voice input 220, processing module 202 can identify the corresponding prompt 210 of interest to the user and perform an operation or provide an instruction corresponding to the prompt.

Figure 3:
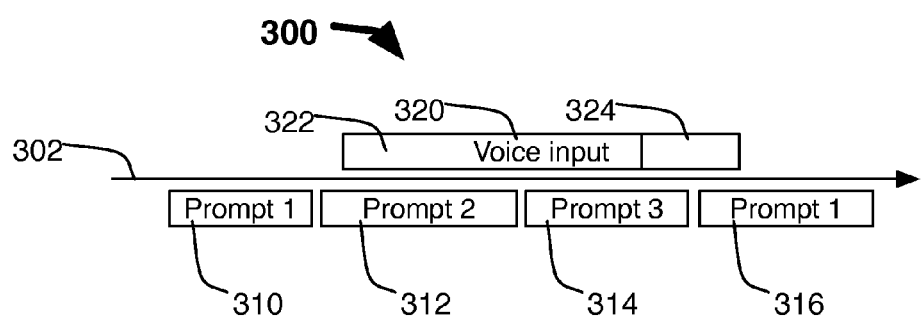
FIG. 3 is a schematic view of an illustrative timeline for providing prompts and receiving voice inputs in accordance with one embodiment of the invention.

As discussed above, because a voice input may take time to be detected, received (e.g., recorded for processing) and processed, the processing module may finish processing a voice input after the prompt that is of interest to the user has been replaced with another prompt. FIG. 3 is a schematic view of an illustrative timeline for providing prompts and receiving voice inputs in accordance with one embodiment of the invention. Timeline 300 can include time axis 302 depicting the passage of time. At an appropriate time, the electronic device (e.g., a processing module) can provide prompts 310, 312, 314 and 316 in sequence. Prompts 310, 312, 314 and 316 can include any suitable type of prompt, including for example individual audio prompts, collections of displayed prompts, or any other prompt. The length of each of the boxes depicting prompts 310, 312, 314 and 316 can provide an indication of the duration during which the prompt is provided (e.g., the time for playing back an audio clip corresponding to an audio prompt). When a user hears a prompt of interest, the user can provide voice input 320 to the device. The box representing voice input 320 can indicate the duration for detecting and receiving the voice input (e.g., portion 322) as well as the duration for processing the voice input and determining the content of the input (e.g., portion 324). As can be seen from the example of timeline 300, voice input 320 can overlap with prompts 312, 314 and 316. Furthermore, portion 322 of voice input 320 overlaps only with prompts 312 and 314, and portion 324 of voice input 320 overlaps only with prompts 314 and 316. In addition, voice input 322 begins shortly after prompt 310 ends. Accordingly, voice input 320 could reasonably apply to any one of prompts 310, 312, 314 and 316. The processing module can therefore require a system or procedure for ensuring that voice inputs are properly associated with corresponding prompts.

Figure 4:
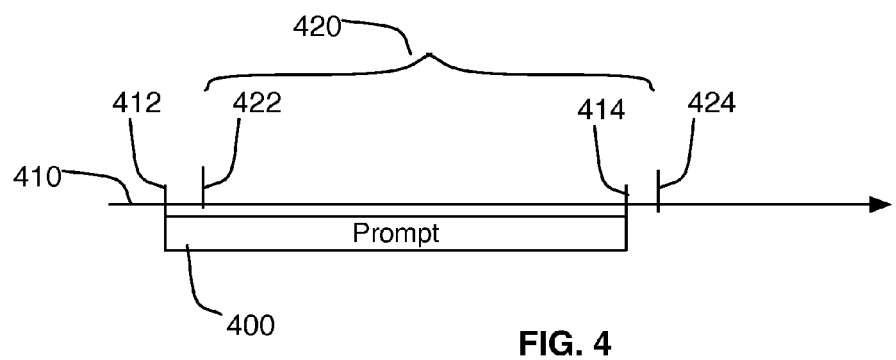
FIG. 4 is a schematic view of a prompt with an associated period in accordance with one embodiment of the invention.

To ensure that a voice input is associated with an appropriate provided prompt, each prompt can be associated with timing information defining a period or input window. If a voice input is received during the period, the voice input will correspond to the prompt. A period can be associated with each prompt using any suitable approach. FIG. 4 is a schematic view of a prompt with an associated period in accordance with one embodiment of the invention. Prompt 400 can be have any suitable duration, including for example a duration defined by time stamps 412 and 414 on timeline 410. The duration can be selected based on the type of prompt, or based on the information provided by the prompt. For example, the duration between time stamps 412 and 414 can be at least long enough for a user to read and understand a written or graphical prompt. As another example, the duration between time stamps 412 and 414 can be selected such that it is at least long enough for a voice output for a particular instruction to be heard in full (e.g., at least long enough to play back an entire audio clip corresponding to a voice output prompt). In some embodiments, the duration between time stamps 412 and 414 can be selected to be longer than the minimum required for the user to understand the prompt to provide the user with a longer input window or period for providing a selection input (e.g., a selection voice input).

Prompt 400 can be associated with input window or period 420 during which detected voice inputs will be assumed to relate to prompt 400. Period 420 can overlap with some or all of the duration between time stamps 412 and 414. For example, period 420 can match the duration of prompt 400. In some embodiments, period 420 can extend beyond one or both of the beginning and end of prompt 400. Because several prompts may be provided in succession, period 420 can be defined such that it does not overlap, or overlaps minimally with a period associated with another prompt. In the example of prompt 400, period 420 can be defined by time stamp 422, which is between time stamps 412 and 414 (e.g., during the period when prompt 400 is provided) and by time stamp 424, which is after time stamp 414 (e.g., when prompt 400 is no longer provided). The duration between time stamps 412 and 422 can be substantially the same as the duration between time stamps 414 and 424, such that when prompt 400 is followed by a subsequent prompt, the period or input window associated with the subsequent prompt will only start at time stamp 424, and not at time stamp 414 (e.g., limiting the overlap between the input windows associated with prompt 400 and the following prompt).

The length and position of the input window or period 420 for each prompt 400 can be defined using any suitable approach. In some embodiments, the duration can be defined based on the beginning and end of a prompt. For example, each period can begin at a particular duration from the beginning of the prompt (e.g., 5 seconds after the beginning, or after 2% of the prompt has been provided), and end at a particular duration from end of the prompt (e.g., at the end of the prompt, after 2% of the duration of the current or next prompt, or after 5 seconds). The period can be defined for the processing module using an initial time stamp and a final time stamp, both of which can be associated with the prompt.

In some embodiments, the length and position of the input window or period 420 can vary based on the particular prompt with which it is associated. In particular, some prompts can be determined to be more important or more likely to be selected by the user. The periods associated with those prompts can then be longer than periods associated with less important prompts or prompts less likely to be selected. For example, the periods associated with prompts more likely to be selected can begin at or closer to the beginning of the prompt, can extend further beyond the end of the prompt, or both.

The electronic device can determine the importance or likelihood of selection of prompts using any suitable approach. In some embodiments, the electronic device can prompt the user to provide an indication of the types of operations that are of most interest, or the particular prompts that the user is likely to select. Alternatively or in addition, the electronic device can determine, from past user interactions with the device, the particular prompts that the user usually selects, or the types of prompts or instructions that the user provides to the device (e.g., create a historical profile of prompts selected by the user in different situations). In some embodiments, the electronic device can identify each of several users using the device, and determine the prompts of interest to each of the several users.

Figure 5:
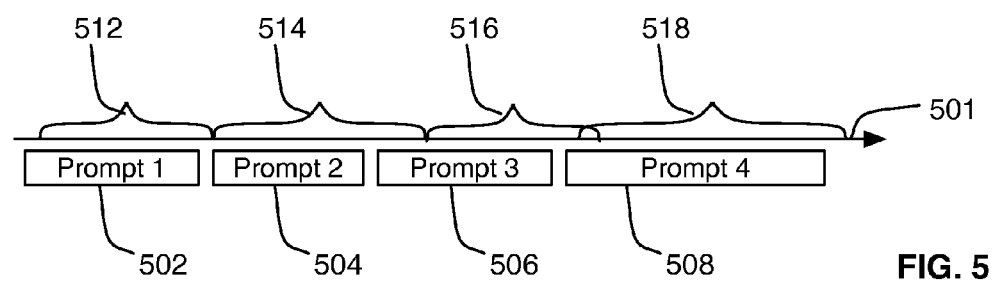
FIG. 5 is a schematic view of an illustrative sequence of prompts to provide in accordance with one embodiment of the invention.

In some embodiments, the order of the prompts can be determined based on the relative importance of the prompts, or on the lengths of the periods associated with each prompt. Because when a prompt period extends passed the end of the prompt, it inherently limits the start point and therefore the duration of the period associated with a subsequent prompt. It may therefore be desirable to place less important prompts between more important prompts provided by the device. FIG. 5 is a schematic view of an illustrative sequence of prompts to provide in accordance with one embodiment of the invention. Sequence 500 can include prompts 502, 504, 506 and 508 provided consecutively along timeline 501. In sequence 500, prompts 504 and 508 can be more important than prompts 502 and 506. Each of the prompts can be associated with a corresponding period 512, 514, 516 and 518, respectively. As shown in FIG. 5, periods 514 and 518, which correspond to more important or relevant prompts 514 and 518, can be substantially longer than periods 512 and 516, which correspond to less important or relevant prompts 502 and 506. In particular, period 512 can end at substantially the end of prompt 502, while period 514 can end after the end of prompt 504 and a significant portion into prompt 506. Period 516 can end shortly after prompt 506 (e.g., extending a short amount into the time during which prompt 508 is provided), while period 518 can extend beyond the end of prompt 508. In the example of sequence 500, periods 516 and 518 can overlap in part. By placing less important prompt 506 between prompts 504 and 508, both periods 514 and 518 can extend beyond the durations of prompts 504 and 508, respectively, and reduce the duration of period 516. Had prompt 506 not been available between prompts 504 and 508, one or both of periods 514 and 518 could have been required to be smaller to accommodate each other, or could have overlapped significantly.

In some embodiments, the electronic device can instead or in addition indirectly control the duration of the period associated with a prompt by adjusting how long the prompt is provided. For example, the electronic device can define each period to substantially match or correspond to the duration of a prompt (e.g., the period matches the prompt start and end times, or is slightly offset from the start and ends times), and vary the duration of each prompt to increase or decrease the period during which received inputs will correspond to the provided prompt. This approach, however, may provide a user experience in which some prompts may be rushed or accelerated while other prompts are drawn out.

Figure 6:
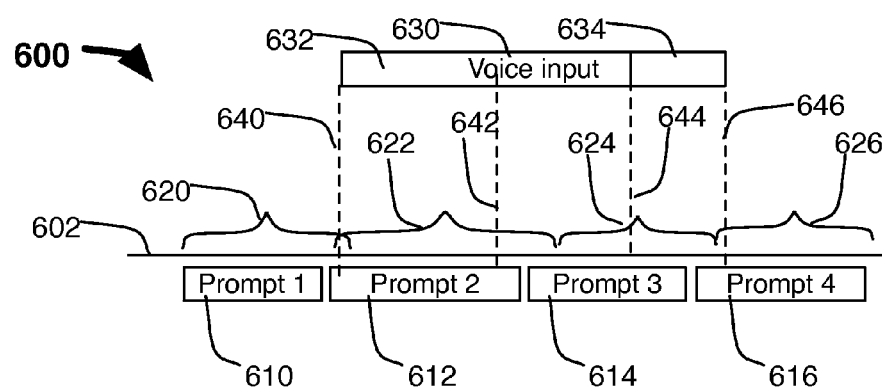
FIG. 6 is a schematic view of an illustrative sequence of prompts and a voice input to process in accordance with one embodiment of the invention.

Once the periods or input windows associated with each prompt have been determined, the electronic device (e.g., the processing module) can determine which part or parts of a voice input to use as a time stamp for identifying the corresponding prompt to which the voice input corresponds. FIG. 6 is a schematic view of an illustrative sequence of prompts and a voice input to process in accordance with one embodiment of the invention. Sequence 600 can include prompts 610, 612, 614 and 616 provided in sequence along timeline 602. Each prompt can be associated with a corresponding period or input window 620, 622, 624 and 626, respectively, during which detected voice inputs are associated with the corresponding prompt. Voice input 630 can be provided while sequence 600 is provided, and can include detected portion 632, corresponding to the detection and recording of a voice input by the electronic device, and processing portion 634, corresponding to the processing of the detected voice input to determine the content of the user's input.

In some cases, voice input 630 can occur as several distinct prompts are provided. In the particular example of FIG. 6, voice input 630 begins at time stamp 640, during which prompt 612 is provided, and ends at time stamp 646, during which prompt 616 is provided. Voice input 630 therefore lasted during the entire period during which prompt 614 was provided. Furthermore, because period 620 corresponding to prompt 610 extends into the time during which prompt 612 is provided, voice input 630 was provided during periods 620, 622, 624 and 626. The electronic device can determine with which of the periods to associate voice input 630 using any suitable approach. In some embodiments, the electronic device can initially determine whether a voice input overlaps with several periods. If the input overlaps with several periods, the electronic device can review the content of the voice input, and attempt to determine the particular prompt with which to associate the voice input based on the voice input content. For example, the electronic device can determine whether the voice input content calls out an instruction or operation of one of the prompts (e.g., "play playlist 3," when the term "playlist 3" is included in one of the prompts or in metadata associated with one of the prompts). As another example, the electronic device can process the voice input to determine whether the instruction relates to any prompt (e.g., the instruction instead is an arbitrary command that does not relate to the prompts, such as "shut down").

In some cases, the electronic device can instead or in addition select a particular characteristic time stamp from voice input 630 to associate with the entire voice input. In some cases, the electronic device can instead or in addition define a time range or duration to characterize the time at which voice input 630 was received. For example, the electronic device can select time stamp 640 or time stamp 646 (e.g., the beginning or end of the voice input). Alternatively, the electronic device can select time stamp 644, which indicates the end of the user provided voice input (e.g., the end of detected portion 632). As still another example, the electronic device can select time stamp 642 from within the period when the device detects the user provided input. Time stamp 642 can correspond to any suitable time during the user provided input, including for example the middle of the input (e.g., half-way between time stamps 640 and 644, or halfway between time stamps 640 and 646), a predetermined time from the beginning or end of the voice input (e.g., 2 seconds after the user begins to speak, or 10% into the received voice input), when a keyword or phrase is received (e.g., when an instruction keyword was received, such as "play," "pause," or "skip), or at any other suitable time within voice input 630.

Once the electronic device has selected a particular time stamp to associate with the voice input, the electronic device can determine the prompt period or input window that includes the time stamp, and then the prompt corresponding to the period or input window. If several overlapping periods or input windows include the time stamp, the electronic device can select a second or alternative time stamp to apply to the voice input. The electronic device can then select the prompt corresponding to the period in which the second time stamp is contained. In some cases, the electronic device can instead or in addition compare the amount of voice input 630

(or of portions 632 and 634) overlapping with each of the several periods or input windows, or with the corresponding prompts (e.g., the amount of voice input 630 overlapping with periods 620 and 622 of prompts 610 and 612, respectively).

Once a particular prompt has been identified, an instruction can be extracted from the content of the processed voice input, and the instruction can be applied to the particular prompt. For example, if the instruction includes a "select" instruction, the operation or process associated with the particular prompt can be performed. As another example, if the instruction includes a "select next" or "go back to last" instruction, the electronic device can perform an operation or process related to providing the prompts (e.g., and provide the last prompt) or to implementing an operation or process associated with a prompt other than the identified particular prompt (e.g., perform the operation from the next prompt instead). As still another example, the instruction can provide one or more variables or values for performing a specific operation associated with the prompt (e.g., providing a media item to serve as a seed for generating a new playlist). Once the instruction has been received and the corresponding operation performed, the electronic device can exit a mode in which prompts are provided (e.g., provided that the instruction does not relate to providing the sequence of prompts). In some embodiments, however, the electronic device can instead or in addition process the voice input to identify the instruction before determining whether the voice input corresponds to a provided prompt. In particular, the electronic device can initially determine whether the voice input instruction relates to one of the prompts (e.g., the voice input is "select this"), and only determine which prompt to associate with the input if the voice input corresponds to a prompt.

Figure 7:
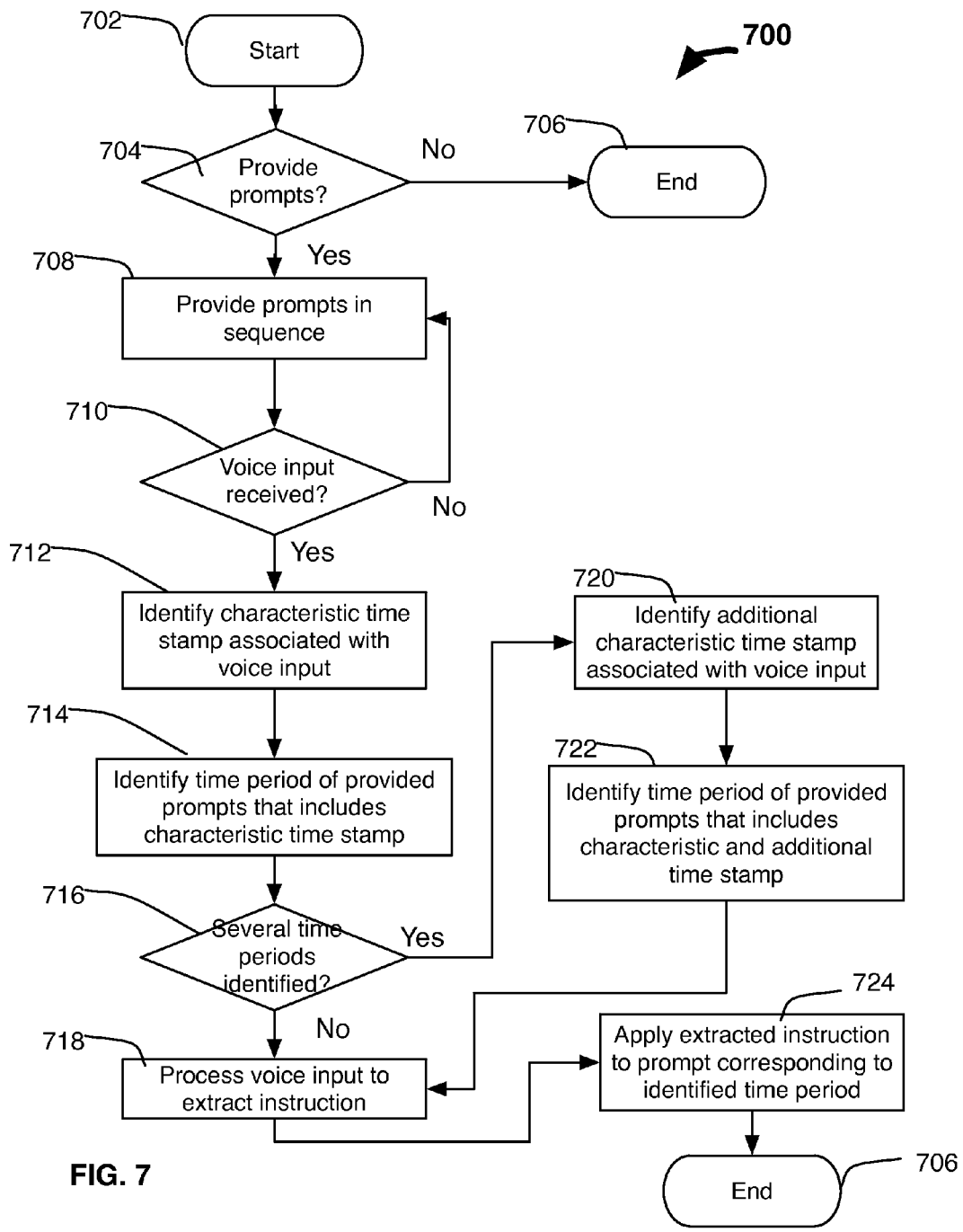
FIG. 7 is a flowchart of an illustrative process for processing a voice input corresponding to a prompt in accordance with one embodiment of the invention.

FIG. 7 is a flowchart of an illustrative process for processing a voice input corresponding to a prompt in accordance with one embodiment of the invention. Process 700 can begin at step 702. At step 704, the electronic device can determine whether prompts were provided. For example, the electronic device can determine whether a mode for providing prompts has been enabled (e.g., whether the user has accessed a voice over menu mode). If the electronic device determines that no prompts have been provided, process 700 can move to step 706 and end.

If, at step 704, the electronic device instead determines that prompts are provided, process 700 can move to step 708. At step 708, the electronic device can provide prompts to the user in sequence. For example, the electronic device can cycle through a set of prompts, where not all prompts are provided at the same time. In particular, the electronic device can provide a series of voice over prompts in sequence. At step 710, the electronic device can determine whether a voice input was received or is being received. For example, the electronic device can determine whether an input interface (e.g., a microphone) has detected a signal corresponding to a voice input. If the electronic device determines that no voice input has been received or is being received, process 700 can return to step 708 and continue to provide prompts in sequence. If, at step 710, the electronic device instead determines that a voice input was or is being received, process 700 can move to step 712.

At step 712, the electronic device can identify a characteristic time stamp associated with the received voice input. For example, the electronic device can identify a start time at which the voice input was received, an end time at which the voice input ended, a time at which the voice input was processed, or any other suitable time during which the voice input was provided or processed. The time stamp can include any suitable a measure of time, including for example device time, time relative to one or more prompts, or any other time that can relate back to the received prompts. At step 714, the electronic device can identify a time period corresponding to one of the provided prompts that includes the characteristic time stamp. For example, the electronic device can identify time periods or input windows associated with each of the provided prompts, and compare the range of the time periods and input windows with the characteristic time stamp. At step 716, the electronic device can determine whether several time periods were identified. For example, the electronic device can determine whether the characteristic time stamp falls within several of the time periods or input windows associated with the received prompts (e.g., if time periods or input windows overlap). If the electronic device determines that the characteristic time stamp falls within only one time period, process 700 can move to step 718. At step 718, the electronic device can process the voice input to extract an instruction. For example, the electronic device can identify the particular words or phrases of the voice input (e.g., by comparing to a dictionary) and identify an instruction associated with the identified words or phrases. Process 700 can then move to step 724.

If, at step 716, the electronic device instead determines that the characteristic time stamp falls within several time periods, process 700 can move to step 720. At step 720, the electronic device can identify an additional characteristic time stamp associated with the received voice input. For example, the electronic device can select another time stamp within the range of times during which the voice input was provided. In some cases, the electronic device can instead or in addition identify a characteristic time range to associate with the voice input. At step 722, the electronic device can identify the time period of the provided prompts that includes original characteristic time stamp and the additional time stamp. For example, the electronic device can identify time periods or input windows associated with each of the provided prompts, and compare the range of the time periods and input windows with the characteristic time stamp and the additional time stamp. Process 700 can then move to step 718, described above. In some embodiments, however, process 700 can return to step 716 to determine whether several time periods are still associated with the original and additional characteristic time stamps. If several time periods are identified, process 700 can return to step 720 at which the electronic device can identify still another additional characteristic time stamp.

At step 724, the electronic device can apply the extracted instruction to the prompt corresponding to the identified time period. For example, the electronic device can execute an instruction selecting a particular prompt, or providing one or more variables needed to perform an operation associated with a particular prompt (e.g., provide a media item to serve as a seed for generating a new playlist). Process 700 can then end at step 706.

Figures 8, 9:
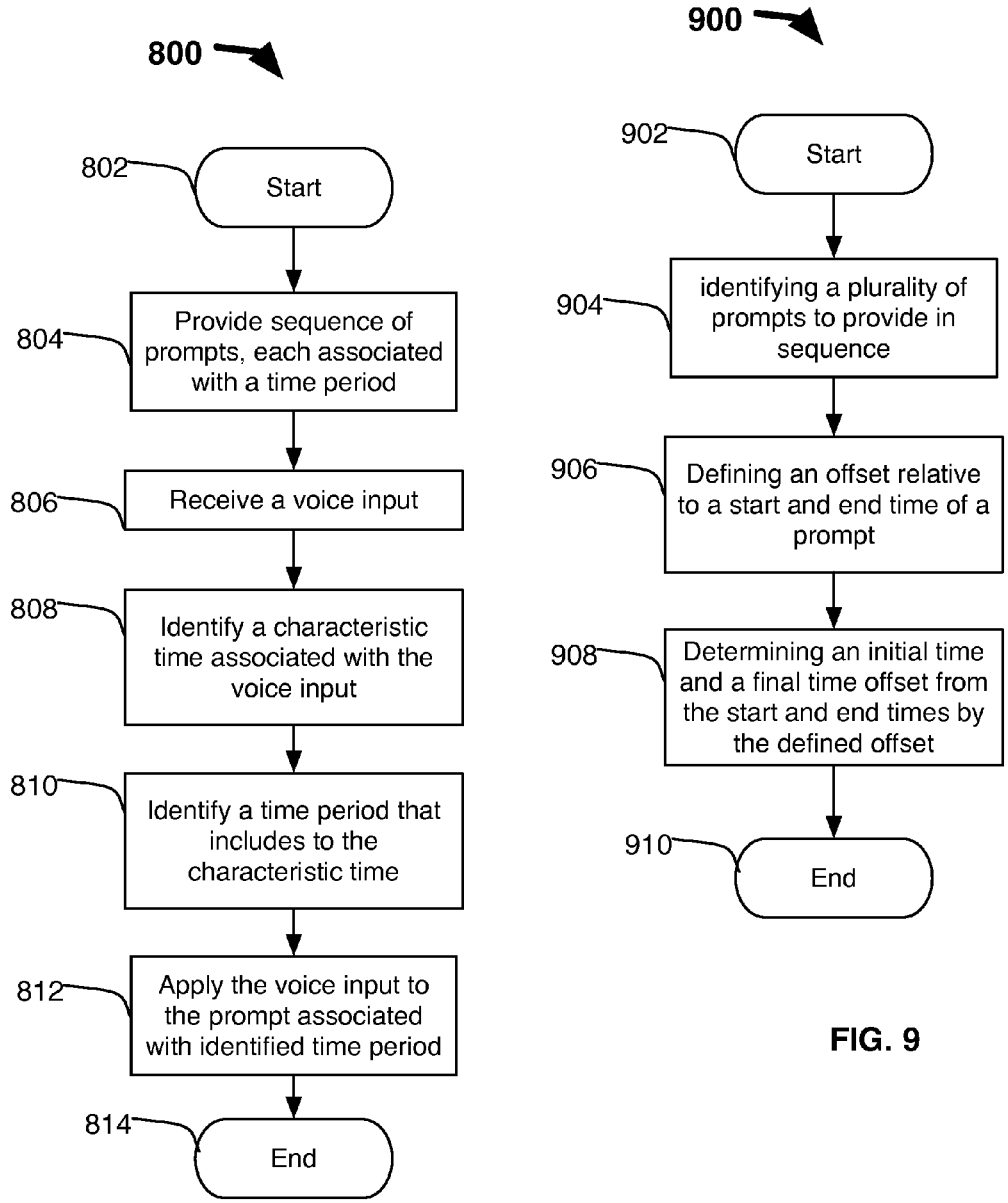
FIG. 8 is a flowchart of an illustrative process for processing a voice input corresponding to a prompt in accordance with one embodiment of the invention.
FIG. 9 is a flowchart of an illustrative process for defining an input window for a prompt in accordance with one embodiment of the invention.

FIG. 8 is a flowchart of an illustrative process for processing a voice input corresponding to a prompt in accordance with one embodiment of the invention. Process 800 can begin at step 802. At step 804, the electronic device can provide a sequence of prompts, each associated with a time period. For example, the electronic device can display or provide an audio output for several device options in sequence. At step 806, the electronic device can receive a voice input. For example, an input interface of the device can receive a voice input. At step 808, the electronic device can identify a characteristic time associated with the voice input. For example, the electronic device can identify a particular time during which the voice input was being received or processed. At step 810, the electronic device can identify a time period that includes the characteristic time. For example, the electronic device can identify a particular period or window of time during which the characteristic time falls. At step 812, the electronic device can apply the voice input to the prompt associated with the identified time. For example, the electronic device can extract an instruction from the voice input, and apply the instruction to the prompt. Process 800 can then end at step 814.

FIG. 9 is a flowchart of an illustrative process for defining an input window for a prompt in accordance with one embodiment of the invention. Process 900 can begin at step 902. At step 904, the electronic device can identify a plurality of prompts to provide in sequence to a user. The prompts can be provided using any suitable approach, including for example using visual, audio or haptic prompts. At step 806, the electronic device can define an offset relative to at least one of a start and end time for providing a prompt. For example, the electronic device can define a duration or percentage of the time allocated for providing a prompt as an offset. At step 908, the electronic device can determine an initial time and a final time defining the boundaries of an input window for the prompt, where at least one of the initial and final times are offset from the start and end times by the defined offset. For example, an input window for determine which voice inputs to associate with a provided prompt can be defined by initial and final time stamps that are offset from the start and end times during which the prompt was provided (e.g., the input window is five seconds later than the time at which the prompt was provided). Process 900 can then end at step 912.

Although many of the embodiments of the present invention are described herein with respect to personal computing devices, it should be understood that the present invention is not limited to personal computing applications, but is generally applicable to other applications.

Embodiments of the invention are preferably implemented by software, but can also be implemented in hardware or a combination of hardware and software. Embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above described embodiments of the invention are presented for purposes of illustration and not of limitation.

What is claimed is:

1. A method for processing a voice input provided in response to a prompt, comprising:
    at an electronic device with at least one processor and memory:
        in response to a user invoking a voice mode, the electronic device providing a sequence of prompts, wherein each prompt is associated with a respective time period of a plurality of time periods;
        receiving a voice input while a prompt of the sequence of prompts is being provided;
        identifying a characteristic time associated with the received voice input;
        identifying a time period of the plurality of time periods that includes the characteristic time; and
        applying the received voice input to a respective prompt of the sequence of prompts associated with the identified time period.

2. The method of claim 1, further comprising:
    defining, for each prompt, an initial time stamp and a final time stamp, wherein the period between the initial time stamp and the final time stamp constitutes the time period associated with the prompt.

3. The method of claim 2, wherein:
    the initial time stamp is different from a time stamp that corresponds to starting to provide the prompt; and
    the final time stamp is different from a time stamp that corresponds to stopping to provide the prompt.

4. The method of claim 3, wherein:
    the final time stamp is after the time stamp that corresponds to stopping to provide the prompt.

5. The method of claim 2, further comprising:
    defining at least one of a final time stamp and an initial time stamp such that time periods associated with sequentially provided prompts overlap.

6. The method of claim 1, further comprising:
    determining the relative importance of each prompt; and
    varying the length of the time period of each prompt based on the determined relative importance of that prompt.

7. The method of claim 6, wherein varying further comprises:
    varying the amount by which the final time stamp exceeds the time stamp that corresponds to stopping to provide the prompt.

8. The method of claim 7, further comprising:
    ordering the prompts such that a less important prompt is between more important prompts to prevent the time periods associated with the more important prompts from overlapping.

9. The method of claim 1, wherein identifying a characteristic time further comprises:
    identifying a characteristic time stamp during which the voice input is received.

10. The method of claim 9, further comprising:
    defining, for each prompt, an initial time stamp and a final time stamp, wherein the period between the initial time stamp and the final time stamp constitutes the time period associated with the prompt; and
    identifying the combination of initial time stamp and final time stamp for which the characteristic time stamp is larger than the initial time stamp but smaller than the final time stamp.

11. The method of claim 1, wherein:
    providing the sequence of prompts further comprises providing a sequence of voice output prompts, wherein each prompt is associated with a distinct electronic device operation.

12. The method of claim 1, wherein the user invoking a voice mode comprises determining whether a mode for providing prompts has been enabled.

13. The method of claim 1, wherein the user invoking a voice mode comprises determining whether the user has accessed a voice over menu mode.

14. The method of claim 1, wherein the applying comprises executing an instruction associated with the prompt corresponding to the identified time period.

15. The method of claim 1, wherein the applying comprises providing one or more variables needed to perform an operation associated with the prompt corresponding to the identified time period.

16. The method of claim 1, wherein the applying further comprises providing a media item to serve as a seed for generating a new playlist.

17. The method of claim 1, wherein:
receiving the voice input while the respective prompt is being provided includes receiving the voice input while a visual prompt is being displayed, an audio prompt is being output, or a haptic prompt is being provided.

18. An electronic device for processing voice inputs, comprising:
an output interface for outputting a plurality of audio prompts in response to a user invoking a voice mode, wherein the audio prompts are provided in succession;
an input interface for receiving a voice input; and
a processing module operative to:
determine that at least two audio prompts were output while the voice input was received;
define a characteristic time stamp for the voice input;
compare the characteristic time stamp with input windows associated with each of the at least two audio prompts, wherein each input window defines a duration during which received inputs correspond to the audio prompt of the input window; and
associate the received voice input with the audio prompt of the input window that includes the characteristic time stamp.

19. The electronic device of claim 18, wherein the processing module is further operative to:
determine that the characteristic time stamp is included in the input windows of the at least two audio prompts;
define an additional characteristic time stamp for the voice input; and
determine which of the input windows includes both the characteristic time stamp and the additional characteristic time stamp.

20. The electronic device of claim 18, wherein the processing module is further operative to:
extract an instruction from the voice input; and
apply the extracted instruction to the audio prompt of the input window that includes the characteristic time stamp.

21. The electronic device of claim 20, wherein the processing module is further operative to:
identify an operation associated with the, audio prompt of the input window that includes the characteristic time stamp;
determine the manner in which to perform the operation based on the received instruction; and
perform the operation in the determined manner.

22. The electronic device of claim 21, wherein the processing module is further operative to:
determine at least one variable characterizing the operation from the instruction; and
perform the operation using the at least one variable from the instruction.

23. The electronic device of claim 18, wherein the user invoking a voice mode comprises determining whether a mode for providing prompts has been enabled.

24. The electronic device of claim 18, wherein the user invoking a voice mode comprises determining whether the user has accessed a voice over menu mode.

25. The electronic device of claim 18, wherein associating the received voice input with the audio prompt comprises executing an instruction associated with the prompt corresponding to the identified time period.

26. The electronic device of claim 18, wherein associating the received voice input with the audio prompt comprises providing one or more variables needed to perform an operation associated with the prompt corresponding to the identified time period.

27. The electronic device of claim 18, wherein associating the received voice input with the audio prompt comprises providing a media item to serve as a seed for generating a new playlist.

28. A method for defining input windows to associate with provided prompts, comprising:
at an electronic device with at least one processor and memory:
in response to a user invoking a voice mode, identifying a plurality of prompts to provide in sequence, wherein each prompt is associated with a distinct electronic device operation;
defining an offset relative to at least one of a start time and an end time for providing each of the plurality of prompts; and
determining, for each of the plurality of prompts, an input window defined by an initial time and a final time for determining which provided prompt of the plurality of prompts to associate with a received voice input, wherein at least one of the initial time and the final time are offset from the start time and end time by the defined offset.

29. The method of claim 28, further comprising:
determining the importance of each prompt; and
varying the defined offset for each prompt based on the importance of the prompt.

30. The method of claim 28, further comprising:
defining a first offset to apply to the initial time relative to the start time; and
defining a second offset to apply to the final time relative to the end time, wherein the first and second offsets are different.

31. The method of claim 28, wherein the offset is defined as at least one of:
a duration;
a percentage of the duration the prompt is provided; and
a percentage of the duration of another prompt provided in the sequence of plurality of prompts.

32. A non-transitory computer readable medium for processing a voice input provided in response to a prompt, the computer readable medium storing instructions for:
automatically providing a sequence of prompts in response to a user invoking a voice mode, wherein each prompt is associated with a respective time period of a plurality of time periods;
receiving a voice input while a prompt of the sequence of prompts is being provided;
identifying a characteristic time associated with the received voice input;
identifying a time period of the plurality of time periods that includes the characteristic time; and
applying the received voice input to a respective prompt of the sequence of prompts associated with the identified time period.

33. The computer readable medium of claim 32, further storing instructions for:
defining, for each prompt, an initial time stamp and a final time stamp, wherein the period between the initial time stamp and the final time stamp constitutes the time period associated with the prompt.

34. The computer readable medium of claim 33, wherein:
the initial time stamp is different from the time stamp corresponding to starting to provide the prompt; and
the final time stamp is different from the time stamp corresponding to stopping to provide the prompt.

35. The computer readable medium of claim 32, wherein:
the instructions for receiving the voice input while the respective prompt is being provided include instructions for receiving the voice input while a visual prompt is being displayed, an audio prompt is being output, or a haptic prompt is being provided.

36. The computer readable medium of claim 32, wherein the user invoking a voice mode comprises determining whether a mode for providing prompts has been enabled.

37. The computer readable medium of claim 32, wherein the user invoking a voice mode comprises determining whether the user has accessed a voice over menu mode.

38. The computer readable medium of claim 32, wherein the applying comprises executing an instruction associated with the prompt corresponding to the identified time period.

39. The computer readable medium of claim 32, wherein the applying comprises providing one or more variables needed to perform an operation associated with the prompt corresponding to the identified time period.

40. The computer readable medium of claim 32, wherein the applying further comprises providing a media item to serve as a seed for generating a new playlist.

\* \* \* \* \*